United States Patent [19]

Doering

[11] 4,017,415
[45] Apr. 12, 1977

[54] PROCESS FOR THE RESTORATION OF THE CHEMICAL LIGHTING POTENTIAL OF A CHEMILUMINESCENT LIGHTING FORMULATION

[75] Inventor: Arthur Albert Doering, Middlesex, N.J.

[73] Assignee: American Cyanamid Company, Stamford, Conn.

[22] Filed: May 29, 1975

[21] Appl. No.: 582,037

[52] U.S. Cl. .................... 252/188.3 CL; 252/186; 252/301.17

[51] Int. Cl.$^2$ .................. C09K 3/00; A61L 13/00; C09K 11/06

[58] Field of Search ... 252/188.3 CL, 186, 301.2 R; 240/2.25

[56] References Cited

UNITED STATES PATENTS

| | | | |
|---|---|---|---|
| 3,311,564 | 3/1967 | Cline | 252/188.3 CL |
| 3,557,233 | 1/1971 | Zweig | 252/188.3 CL |
| 3,691,085 | 9/1972 | Roberts | 252/188.3 CL |
| 3,718,599 | 2/1973 | Rauhut | 252/188.3 CL |
| 3,729,426 | 4/1973 | Zweig | 252/188.3 CL |
| 3,749,679 | 7/1973 | Raunut | 252/188.3 CL |
| 3,808,414 | 4/1974 | Roberts | 240/2.25 |
| 3,850,836 | 11/1974 | Richter | 252/188.3 CL |
| 3,888,786 | 6/1975 | Maulding | 252/188.3 CL |
| 3,948,797 | 4/1976 | Vega | 252/188.3 CL |

OTHER PUBLICATIONS

Clark, "The Encyclopedia of Chemistry" (1966) Van Nostrand, pp. 123 and 124.

Primary Examiner—Samuel W. Engle
Assistant Examiner—Donald P. Walsh
Attorney, Agent, or Firm—Gordon L. Hart

[57] ABSTRACT

Oxalate diester solutions for use in two component chemical light systems sometimes fail to produce high intensity light instantaneously. The invention is a method of restoring activity of such solutions by treatment with alumina.

5 Claims, No Drawings

PROCESS FOR THE RESTORATION OF THE CHEMICAL LIGHTING POTENTIAL OF A CHEMILUMINESCENT LIGHTING FORMULATION

The invention relates to improvements in chemical light and more particularly to improvements in the preparation of active components used in a chemical light system.

The type of chemical light system to which the invention relates is prepared by mixing two liquid components which are kept separate until light is desired, at which time the two liquid components are mixed to produce chemical light by reaction of an oxalate diester and a hydroperoxide compound in presence of a fluorescer and a catalyst, all in a suitable solvent for the mixture.

One of the two liquid components, called the oxalate component, is a liquid solution of an oxalate diester reactant in a suitable non-aqueous liquid solvent. This solution may also contain a fluorescer in solution. The other component, called the activator component, is a liquid solution of hydroperoxide reactant in a liquid non-aqueous solvent. This solution may also contain a catalyst. When these two liquid components are mixed, the reaction immediately produces visible light of high intensity.

Without a catalyst in the mixture, there will be an induction period of several minutes before any light is produced and the very high-intensity luminosity does not occur either initially or even when light is produced after an induction period. Sometimes, even when a catalyst is present, there will be an occasional unpredictable instance when mixing of the two components will not produce the desired initial high-intensity luminosity and there is an induction period before any light is produced. It was determined by investigation that these occasional failures are caused by some unexplained fault in the oxalate component. When an oxalate component is found having this undesired fault, it is called "unacceptable oxalate component".

In prior art, such unacceptable oxalate components could be treated in some instances to restore their regular activity by contacting the liquid oxalate component with a solid molecular sieve material, e.g. Linde Molecular Sieves - Type 5A or the like. This treatment was successful in many cases, but not in every case.

Now we have found another treatment for correcting unacceptable oxalate components that will also restore the regular activity in many cases. In some instances the new treatment is found to restore activity even when a previous treatment of unacceptable oxalate component with molecular sieve materials has proved unsuccessful.

According to the invention, an unacceptable oxalate component, as defined, is treated to restore regular chemical light activity by contacting the liquid oxalate component with solid aluminum oxide. Any suitable means for liquid-solids contact could be used for the treatment. We prefer to simply stir the solids and liquid together for time sufficient to effect the desired restoration of activity and then to separate by filtration, but other suitable contacting methods, such as passing the liquud through a column packed with solid alumina particles could be used. Any convenient temperature is suitable for contacting the materials. We find it convenient to contact at temperature about room temperature, i.e., about 20°–30° C. but other temperatures could be used, for example in the range from 0° C. to 100° C.

The ratio of solids to liquids during the treatment and the contact time needed may vary according to the selected method of contacting the liquid with the solid. When the treatment is carried out by stirring the solid and liquid together it is convenient to stir in about 1 to 10 percent by wt. solids, based on the liquid weight, and we usually prefer to use about 3 to 5 percent solids by weight. The contact time needed to complete the treatment will vary in the range from about ½ hour to about 5 hours; usually about 1 to 2 hours is sufficient.

Any of the usual aluminum oxides of either neutral or basic compositions are effective for use in the treatment. When a basic aluminum oxide is used for the treatment, it does not alter the behavior of the oxalate component in the way that the introduction to the solution of some basic catalyst compounds such as sodium salicylate would do. This leads us to conclude that the alumina treatment does not introduce basic material into the liquid solution during the treatment. We prefer to use anhydrous activated alumina but other alumina may be used if desired.

In the specific examples that follow, the oxalate components that are treated consist of a solution of an oxalate diester and a fluorescer in organic solvent. The treatment of the invention is effective for restoring regular activity of other unacceptable oxalate components that contain ingredients which may differ from the specific ingredients that were used for the examples. The invention is effective for treatment of oxalate components which comprise any of the oxalate diesters described in U.S. Pat. No. 3,749,679 or the like. Such oxalate diesters include bis-(2,4,5-trichloro-6-carbopentoxyphenyl) oxalate, bis(2,4,5-trichloro-6-carbobutoxyphenyl) oxalate, and bis(2,4,5-tribromo-6-carbohexoxyphenyl) oxalate. Similarly the treatment of the invention can be used to restore oxalate components that have fluorescer or solvent ingredients other then those used for the examples. Any of the fluorescers described in U.S. Pat. No. 3,729,426 or in U.S. Application Ser. No. 418,493 filed Nov. 23, 1973 could be in the oxalate components treated, for example, 9,10-bis(phenylethynly)anthracene; 1,8-dichloro-9-10-bis(phenylethynyl)anthracene; 1,5-dichloro-9,10-bis(-phenylethynyl)anthracene; 2,3-dichloro-9,10-bis(-phenylethynyl)anthracene, and rubrene. Other solvents or mixtures of solvents, that might be in an oxalate component treated by the process of the invention include those described in U.S. Pat. No. 3,749,679 and U.S. Application Ser. No. 418,493 filed Nov. 23, 1973 and may include one or more specific solvents as ethyl benzoate, dibutyl phthalate and dimethyl phthalate.

The concentration of the oxalate diester in the oxalate component can vary widely from 0.01 M to 1.5 M. Preferably the molar concentration of the oxalate diester in the solution is from 0.03 M to 0.3 M. When a fluorescer is also incorporated in the oxalate solution, the fluorescer concentration in the oxalate component solution is in the range from about 0.0002 M to 0.03 M. Preferably, the concentration ranges from 0.001 to 0.005 Molar. In the process of the invention, only the oxalate component is treated. The activator component is not treated, but the invention is effective for the treatment of oxalate components that are intended for use in a chemical light system with any of a variety of liquid activator components which may comprise any suitable peroxide reactant with any suitable catalyst in any suitable solvent. Suitable peroxide reactants for use in the activated component are described in U.S. Pat. No. 3,808,414 and include, for example, hydrogen peroxide, 6-butylhydroperoxide and peroxybenzoic acid. Suitable catalysts are described in more detail in U.S. Pat. No. 3,749,679 and include for example sodium salicylate, tetrabutylammonium salicylate and potassium salicylate. Solvents useful for the activator component are described in U.S. Pat. No. 3,749,679 and include for example mixtures of dimethyl phthalate and tertiary alcohols, such as tertiary butanol and 3-methyl-3pentanol.

In the following examples the oxalate components were prepared and selected by making up several solutions of bis(2,4,5-trichloro-6-carbopentoxyphenyl)oxalate (0.133 molar) and 9,10-bis(phenylethynyl)anthracene (0.003 molar) in dibutyl phthalate solvent. This oxalate diester was synthesized by the method described in U.S. Pat. No. 3,749,679. Samples from each solution were tested to find unsuitable solutions which would have the initial luminosity failure characteristic of an unacceptable oxalate component. Those were the solutions selected for treatment in most of the examples.

EXAMPLE 1

Several samples from an oxalate component solution that had been found unacceptable because of the characteristic initial luminosity failure, were treated by mixing 3 percent by weight of finely divided alumina particles into each sample and stirring each at room temperature for 1 hour. In some samples the alumina was neutral (Woelm's Neutral) alumina. In others, a basic activated alumina was used. After one hour of treatment the alumina was removed by filtration and each liquid sample was tested by mixing a 7.5 ml of the sample oxalate component with 2.5 ml of activator component which is a solution of 1.5 molar hydrogen peroxide and $6.25 \times 10^{-4}$ molar sodium salicylate in solvent which is 80 percent by volume dimethyl phthalate, 20 percent by volume tertiary butanol. The light emission is measured by means of a broadband photometer and a luminosity value is determined on initial mixing and at several intervals following. The test results are tabulated in Table I, which also shows test results obtained by testing an untreated sample of the same unacceptable oxalate component as a control.

The luminosity measurements were made using long 6 inches cylindrical lightsticks in a luminometer, an instrument that automatically measures and prints-out the luminosity values by means of a broadband photometer, a digital voltmeter, and a teletype. The calibration of the luminometer was made by measuring the brightness of a known volume of sample in a cuvette on a spectroradiometer and converting the brightness values in foot lamberts per centimeter to lumens per liter so that the teletype print-out represents the luminosity.

Table I

| Comments | Luminosity (lumens per liter) Versus Time | | | | | |
|---|---|---|---|---|---|---|
| | 0 Min. | 10 Min. | 30 Min. | 60 Min. | 90 Min. | 120 Min. |
| Before Treatment | 15 | 341 | 203 | 77 | 26 | 9 |
| Before Treatment | 13 | 364 | 212 | 82 | 27 | 19 |
| After Treatment With Neutral Alumina | 2000 | 304 | 186 | 57 | 20 | 8 |
| After Treatment With Neutral Alumina | 2000 | 304 | 195 | 62 | 22 | 9 |
| After Treatment With Basic Alumina | 2000 | 354 | 190 | 41 | 9 | 1 |
| After Treatment With Basic Alumina | 2000 | 358 | 188 | 41 | 8 | 2 |

EXAMPLE II

It is well known that the presence of a basic material, such as sodium salicylate, in the oxalate component solution will eliminate an induction period when the oxalate and activator components are mixed. The following examples illustrate that acceptable oxalate components of the same composition described in Example 1, when treated with either neutral or basic alumina do not behave as though a basic material has been introduced into the solution. In these examples a special activator which does not contain sodium salicylate or other basic catalyst is used with an acceptable oxalate, untreated (Sample A); with the same acceptable oxalate treated with 5 percent basic alumina (Sample B); and with the same acceptable oxalate treated with 5 percent neutral alumina (Sample C). The test results obtained with these materials are listed in Table II.

Table II

| Sample | Luminosity (lumens per liter) Versus Time | | | | | |
|---|---|---|---|---|---|---|
| | 0 Min. | 10 Min. | 30 Min. | 60 Min. | 90 Min. | 120 Min. |
| A | 0 | 10 | 10 | 10 | — | — |
| B | 0 | 9 | 16 | 17 | — | — |
| C | 0 | 7 | 12 | 13 | — | — |

The fact that the light intensities emitted by Samples B and C are not significantly different from those of Sample A shows that the treatment with alumina has not introduced basic catalyst material into the oxalate component solution.

EXAMPLE III

Several samples of unacceptable oxalate component are treated by stirring each for one hour at room temperature with from one to five percent by weight of a neutral activated alumina, based on the weight of the oxalate component. The test results tabulated in Table III show that improved results are obtained with all treatments and best results are obtained with 3 to 5 percent by weight of the neutral activated aluminum oxide.

tially and then tested after storage for 5 weeks at 20° C.

Table V

| Comments | Luminosity (lumens per liter) Versus Time | | | | | |
|---|---|---|---|---|---|---|
| | 0 Min. | 10 Min. | 30 Min. | 60 Min. | 90 Min. | 120 Min. |
| Untreated, tested initially | 0 | 220 | 189 | 120 | 57 | 32 |
| Untreated, tested initially | 0 | 216 | 197 | 109 | 64 | 35 |
| Treated and tested initially | 1780 | 204 | 148 | 101 | 57 | 36 |
| Treated and tested initially | 2000 | 249 | 166 | 91 | 51 | 28 |
| Treated initially, tested after 5 Weeks at 20° C. | 1720 | 236 | 163 | 77 | 41 | 25 |
| Treated initially tested after 5 Weeks at 20° C. | 2000 | 262 | 168 | 77 | 45 | 25 |

Table III

| Comments | Luminosity (lumens per liter) Versus Time | | | | | |
|---|---|---|---|---|---|---|
| | 0 Min. | 10 Min. | 30 Min. | 60 Min. | 90 Min. | 120 Min. |
| Untreated | 18 | 371 | 207 | 86 | 35 | 18 |
| Untreated | 18 | — | 221 | 89 | 35 | 18 |
| 1% Neutral Alumina | 225 | 250 | 138 | 89 | 53 | 33 |
| 1% Neutral Alumina | 804 | 341 | 186 | 79 | 32 | 16 |
| 3% Neutral Alumina | 1000 | 303 | 183 | 84 | 37 | 18 |
| 3% Neutral Alumina | 1000 | 308 | 183 | 86 | 36 | 17 |
| 5% Neutral Alumina | 1000 | 310 | 195 | 90 | 41 | 22 |
| 5% Neutral Alumina | 1000 | 293 | 187 | 87 | 39 | 21 |

EXAMPLE IV

For this example an unacceptable oxalate component was found that did not respond to treatment by stirring with 5 percent by weight of molecular sieves (Linde Molecular Sieves — Type 5A) at room temperature for 3 hours. Other samples of the same solution were treated with the same neutral activated alumina described in Example I under the same conditions. The test results tabulated in Table IV were measured after mixing 7.5 ml of each of the several untreated and treated oxalate components with 2.5 ml of the same activator component described in Example 1.

Table IV

| Comments | Luminosity (lumens per liter) Versus Time | | | | | |
|---|---|---|---|---|---|---|
| | 0 Min. | 10 Min. | 30 Min. | 60 Min. | 90 Min. | 120 Min. |
| Untreated | 0 | 220 | 189 | 120 | 57 | 32 |
| Untreated | 0 | 216 | 197 | 109 | 64 | 35 |
| 5% Molecular Sieves | 0 | 270 | 176 | 104 | 48 | 25 |
| 5% Molecular Sieves | 0 | 287 | 186 | 111 | 52 | 24 |
| 5% Neutral Alumina | 2000 | 227 | 159 | 92 | 48 | 26 |
| 5% Neutral Alumina | 2000 | 235 | 162 | 99 | 51 | 26 |

EXAMPLE V

The following example illustrates the fact that an oxalate component restored to activity by treatment with alumina maintains high lighting potential even after storage for several weeks.

A sample of the oxalate component which has been treated with 5 percent neutral activated alumina and then stored for 5 weeks in a sealed can at 20° C. is tested by mixing 7.5 mls with 2.5 mls of activator component. The test results obtained initially before and after treatment and with another sample treated ini-

I claim:

1. An improved method of treatment for oxalate component solution useful in a chemical light system, said oxalate component solution comprising an oxalate diester in liquid solution, and said component prior to treatment having a characteristic failure to produce initial high intensity luminosity on mixture with liquid activator component comprising peroxide and basic catalyst in liquid solvent, said improved method comprising the steps of contacting the defined liquid oxalate component with solid aluminum oxide for a period of time sufficient to correct the defined characteristic failure and then separating the treated liquid from the solid.

2. A method defined by claim 1 wherein the defined aluminum oxide is neutral activated alumina.

3. A method defined by claim 1 wherein the defined aluminum oxide is basic activated alumina.

4. A method defined by claim 1 wherein the defined oxalate component further comprises a fluorescer in the liquid solution.

5. A method defined by claim 4 wherein the defined oxalate component consists essentially of bis(2,4,5-trichloro-6-carboxypentoxyphenyl) oxalate as the defined oxalate diester and 9,10-bis(phenylethynyl) anthracene as the defined fluorescer, both dissolved in dibutylphthalate solvent.

* * * * *